United States Patent
Kawasaki et al.

(10) Patent No.: US 7,965,837 B2
(45) Date of Patent: Jun. 21, 2011

(54) METHOD AND SYSTEM FOR WIRELESS DIGITAL VIDEO PRESENTATION

(75) Inventors: Kenichi Kawasaki, San Diego, CA (US); David A. Desch, Poway, CA (US); Robert L. Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1431 days.

(21) Appl. No.: 10/666,724

(22) Filed: Sep. 19, 2003

(65) Prior Publication Data

US 2004/0217948 A1  Nov. 4, 2004

Related U.S. Application Data

(60) Provisional application No. 60/467,346, filed on Apr. 30, 2003.

(51) Int. Cl.
*H04N 7/167* (2006.01)
(52) U.S. Cl. .......................................... 380/200; 380/239
(58) Field of Classification Search .................... None
See application file for complete search history.

(56) References Cited

U.S. PATENT DOCUMENTS

| | | |
|---|---|---|
| 5,115,309 A | 5/1992 | Hang |
| 5,523,795 A | 6/1996 | Ueda |
| 5,613,191 A | 3/1997 | Hylton et al. ................... 455/3.1 |
| 5,630,204 A | 5/1997 | Hylton et al. ................... 455/3.3 |
| 5,668,566 A | 9/1997 | Yen ..................................... 345/2 |
| 5,708,961 A | 1/1998 | Hylton et al. ................... 455/4.2 |
| 5,712,946 A * | 1/1998 | Yanagihara ..................... 386/68 |
| 5,793,413 A | 8/1998 | Hylton et al. ................... 348/12 |
| 5,802,469 A | 9/1998 | Nounin et al. ................. 455/422 |
| 5,878,324 A | 3/1999 | Borth et al. ..................... 455/3.1 |
| 5,881,074 A * | 3/1999 | Rao ................................. 714/786 |
| 5,940,757 A | 8/1999 | Callaway, Jr. ................. 455/426 |
| 5,999,571 A | 12/1999 | Shin et al. ....................... 375/292 |
| 6,005,605 A | 12/1999 | Kostreski et al. .............. 348/21 |
| 6,008,777 A | 12/1999 | Yiu ..................................... 345/2 |
| 6,088,007 A | 7/2000 | Shioya |
| 6,263,503 B1 | 7/2001 | Margulis .......................... 725/81 |

(Continued)

FOREIGN PATENT DOCUMENTS

EP  1206054  5/2002

(Continued)

OTHER PUBLICATIONS

Hardacker et al., "Method and System for Wireless Digital Multimedia Presentation", U.S. Appl. No. 10/744,903, filed Dec. 22, 2003.

*Primary Examiner* — Benjamin E Lanier
(74) *Attorney, Agent, or Firm* — John L. Rogitz

(57) ABSTRACT

High definition (HD) video may be sent from, e.g., a laptop computer on a table in a room to a video projector mounted on the ceiling using a 60 GHz high capacity (2.5 Gbps) wireless link. At this frequency and data rate, the signal is so short range and directional that low power may be used and the video may be transmitted in an uncompressed form such that so much data is transmitted each second that bootlegging the content is essentially untenable. No wiring between the HD video source and the HD video display is necessary.

25 Claims, 1 Drawing Sheet

U.S. PATENT DOCUMENTS

| | | | |
|---|---|---|---|
| 6,374,085 B1 * | 4/2002 | Saints et al. | 455/69 |
| 6,492,973 B1 | 12/2002 | Kuroki et al. | 345/100 |
| 6,535,029 B2 | 3/2003 | Shih et al. | 327/65 |
| 6,553,239 B1 | 4/2003 | Langston | 455/562 |
| 6,564,269 B1 | 5/2003 | Martin | 710/20 |
| 6,593,895 B2 * | 7/2003 | Nesic et al. | 343/795 |
| 6,647,015 B2 | 11/2003 | Malkemes et al. | 370/401 |
| 7,006,995 B1 * | 2/2006 | Edenson et al. | 705/51 |
| 7,092,693 B2 | 8/2006 | Boyden et al. | |
| 7,242,772 B1 * | 7/2007 | Tehranchi | 380/223 |
| 2001/0021998 A1 | 9/2001 | Margulis | 725/81 |
| 2002/0038459 A1 | 3/2002 | Talmola et al. | 725/81 |
| 2002/0072357 A1 | 6/2002 | Matsuda | 455/422 |
| 2002/0136241 A1 | 9/2002 | Pasqualino et al. | 370/493 |
| 2002/0159035 A1 * | 10/2002 | Koyama et al. | 353/31 |
| 2002/0183003 A1 * | 12/2002 | Chang et al. | 455/41 |
| 2003/0048851 A1 | 3/2003 | Hwang et al. | 375/240.26 |
| 2003/0097662 A1 | 5/2003 | Russ et al. | |
| 2003/0117587 A1 * | 6/2003 | Olson et al. | 353/30 |
| 2003/0122931 A1 | 7/2003 | Pasqualino | 348/194 |
| 2003/0126623 A1 | 7/2003 | Hara et al. | 725/153 |
| 2003/0145336 A1 | 7/2003 | Matsuzaki et al. | 725/136 |
| 2003/0152160 A1 | 8/2003 | Bauch et al. | 375/295 |
| 2003/0226149 A1 | 12/2003 | Chun et al. | 725/78 |
| 2003/0229900 A1 | 12/2003 | Reisman | |
| 2005/0120381 A1 | 6/2005 | Yamaguchi | |
| 2005/0136990 A1 | 6/2005 | Hardacker | |
| 2005/0223407 A1 | 10/2005 | Fullerton et al. | |
| 2007/0237332 A1 | 10/2007 | Lyle | |

FOREIGN PATENT DOCUMENTS

| | | |
|---|---|---|
| JP | 2000307494 | 11/2000 |
| JP | 2001345751 | 12/2001 |
| JP | 200223430 | 8/2002 |
| JP | 2002246921 | 8/2002 |
| JP | 2007023347 | 2/2007 |
| WO | 0251150 | 6/2002 |

* cited by examiner

METHOD AND SYSTEM FOR WIRELESS DIGITAL VIDEO PRESENTATION

RELATED APPLICATIONS

This application claims priority from U.S. provisional patent application Ser. No. 60/467,346, filed Apr. 30, 2003.

FIELD OF THE INVENTION

The present invention relates generally to wireless digital presentation systems.

BACKGROUND OF THE INVENTION

It is often desired to display multimedia programs or shows in a room using a video projector. Typically, the presenter's laptop computer or other source of multimedia is connected to the video projector to send the multimedia to the projector for display on a screen in the room.

As recognized herein, to save table space and to increase people's mobility and viewing lines in the room, it may be desirable to mount the projector on the ceiling, out of the way but nonetheless oriented to project the video onto the screen. The present invention further understands, however, that while power cabling exists in most ceilings, data transmission lines often do not. As a consequence, the present invention understands that wireless communication of the multimedia from the laptop or other source to a ceiling-mounted projector would be advantageous.

The present invention further understands, however, that not just any wireless transmission system will do. Specifically, if a wireless link such as IEEE 802.11(b) is used that has a bandwidth which is insufficient to carry either compressed or uncompressed multimedia such as uncompressed high definition (HD) video, compressed multimedia standard definition (SD) video would have to be transmitted, requiring a relatively expensive decompression module at the projector. Some links such as IEEE 802.11(a) do have a bandwidth high enough to carry compressed HD vide but not uncompressed SD or HD video. Also, in the case of 802.11(a) copyright protection may be implicated because the link is sufficiently long range (extending beyond the room in which it originates) that it can be detected beyond the immediate location of the transmitting laptop. With this in mind, the present invention recognizes the need for a very short range, preferably directional, high bandwidth wireless link that is particularly suited for the short range wireless communication of uncompressed multimedia, particularly the rather voluminous genre of multimedia known as HD video.

SUMMARY OF THE INVENTION

A system includes a source of multimedia data such as a laptop computer and a displayer of multimedia data such as a projector. The displayer can be mounted on a ceiling in a room in which the source is disposed, with the source wirelessly transmitting the multimedia data in an uncompressed form to the displayer on a primary link at approximately sixty GigaHertz (60 GHz). The preferred primary link has a data rate of at least two Giga bits per second (2.0 Gbps) and may have a data rate of 2.5 Gbps.

If desired, the primary link may be a full duplex link, and encryption keys and/or displayer control signals and/or and capability signals can be multiplexed with the multimedia data on the primary link. Alternatively, the displayer and source can communicate these non-multimedia signals on a secondary link having a data rate lower than the data rate of the primary link. The control signals are useful for establishing a source transmission power level and/or a source antenna beam control.

In another aspect, a method for transmitting multimedia data includes disposing a multimedia transmitter and a multimedia receiver in a room, and establishing a wireless link between the transmitter and receiver. The method includes wirelessly transmitting a multimedia signal on the link from the transmitter to the receiver at a frequency sufficiently high that the signal substantially cannot be received outside the room.

In still another aspect, a computer includes means for storing multimedia data. The computer also includes means for wirelessly transmitting, to a receiver, the multimedia data in uncompressed form at a frequency of approximately sixty GigaHertz (60 GHz) such that unless the receiver is in the same room as the computer it substantially cannot receive the multimedia data.

In yet another aspect, a multimedia player includes means for storing multimedia data, and means for wirelessly receiving, from a transmitter, the multimedia data at a frequency of approximately sixty GigaHertz (60 GHz), and a data rate of at least two Giga bits per second (2.0 Gbps). With this combination of features, unless the transmitter is in the same room as the multimedia player the multimedia player substantially cannot receive the multimedia data.

In another aspect, a system includes a source of multimedia data and a display for the multimedia data. The source wirelessly transmits the multimedia data in an uncompressed form to the display on a primary link at approximately sixty GigaHertz (60 GHz).

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
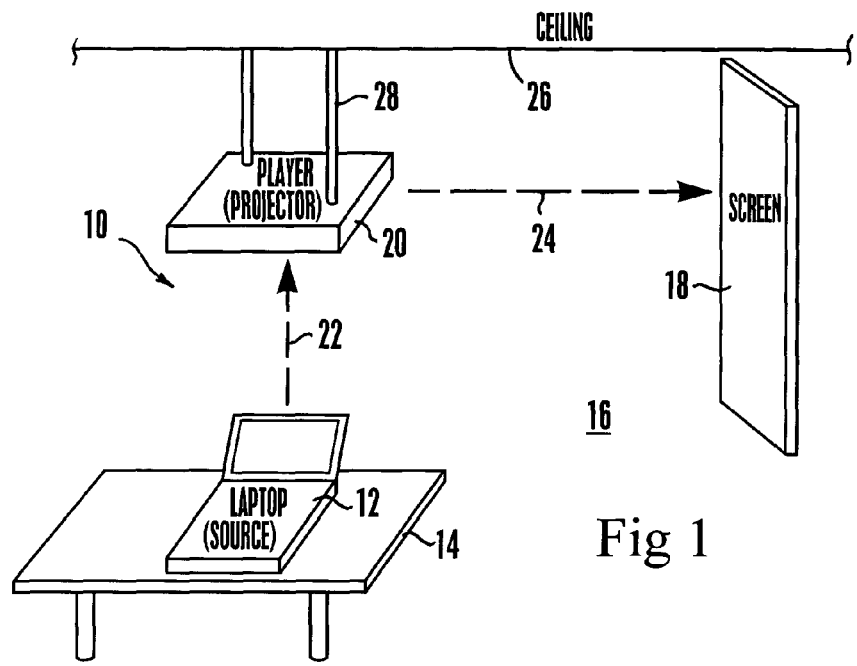
FIG. 1 is a block diagram showing the present system.

Referring initially to FIG. 1, a system is shown, generally designated 10, which includes a source 12 of multimedia data, and in particular HD video. The source 12 may be a laptop computer or other multimedia computer or server that, for instance, a user may place on a table 14 in a room 16 to display the multimedia on a screen or wall 18. While only a single source 12 is shown, it is to be understood that more than one source 12 may be provided to share use of the below-described player or projector. For example, in addition to a laptop computer, a camcorder, a DVD player, and other multimedia sources may be in wireless communication with the player or projector discussed below, in the same room as the source 12.

FIG. 1 shows that a multimedia player 20 such as a video projector may receive the multimedia over a wireless link 22, for displaying the multimedia on the screen or wall 18 as indicated by the arrow 24. While FIG. 1 shows that the player 20 is in front of the screen 18, it is to be understood that the player 20 may be located behind the screen 18 to project multimedia images through the screen 18.

In the preferred embodiment shown, the player 20 advantageously is mounted on a ceiling 26 of the room 16 by, e.g., one or more mounting brackets or struts 28, either in front of or behind the screen 18 depending on the type of player. Owing to the presently envisioned wireless link, no wiring except for power need be installed in the ceiling 26, and the player 20 need not include an MPEG or other video decompression module.

Alternatively, the multimedia player may include a cathode ray tube (CRT), liquid crystal display (LCD), plasma display panel (PDP), or TFT for displaying the multimedia data. The source of multimedia data may be a set-top box like device capable of decoding compressed multimedia content as received from a satellite, cable, terrestrial broadcast, internet streaming, or other source. The data communication described herein may use digital visual interface (DVI) protocols.

In accordance with present principles, the link 22 is a primary link that carries a frequency which is sufficiently high that the signal on the link substantially cannot be received outside the room. Also, multimedia may be transmitted in an uncompressed form on the link 22 such that so much data is transmitted each second that bootlegging the content is essentially untenable, although some data compression less preferably may be implemented. The data may also be transmitted in compressed form if desired. As discussed further below, the link 22 preferably operates at a fixed (unvarying, single-only) frequency of approximately sixty GigaHertz (60 GHz), and more preferably in the range of 59 GHz-64 GHz, and the link 22 has a data rate, preferably fixed, of at least two Giga bits per second (2.0 Gbps). When DQPSK is used the data rate may be 2.2 Gbps, and the link may have a data rate of approximately 2.5 Gbps. The link may have a fixed bandwidth of two and half GigaHertz (2.5 GHz). Error correction appropriate for wireless transmission (e.g., Reed-Solomon encoding) as well as appropriate re-multiplexing (e.g., by re-multiplexing twenty four lines of video and appropriate control signals into two in the case of QPSK modulation) preferably are implemented in accordance with wireless transmission principles known in the art.

Figure 2:
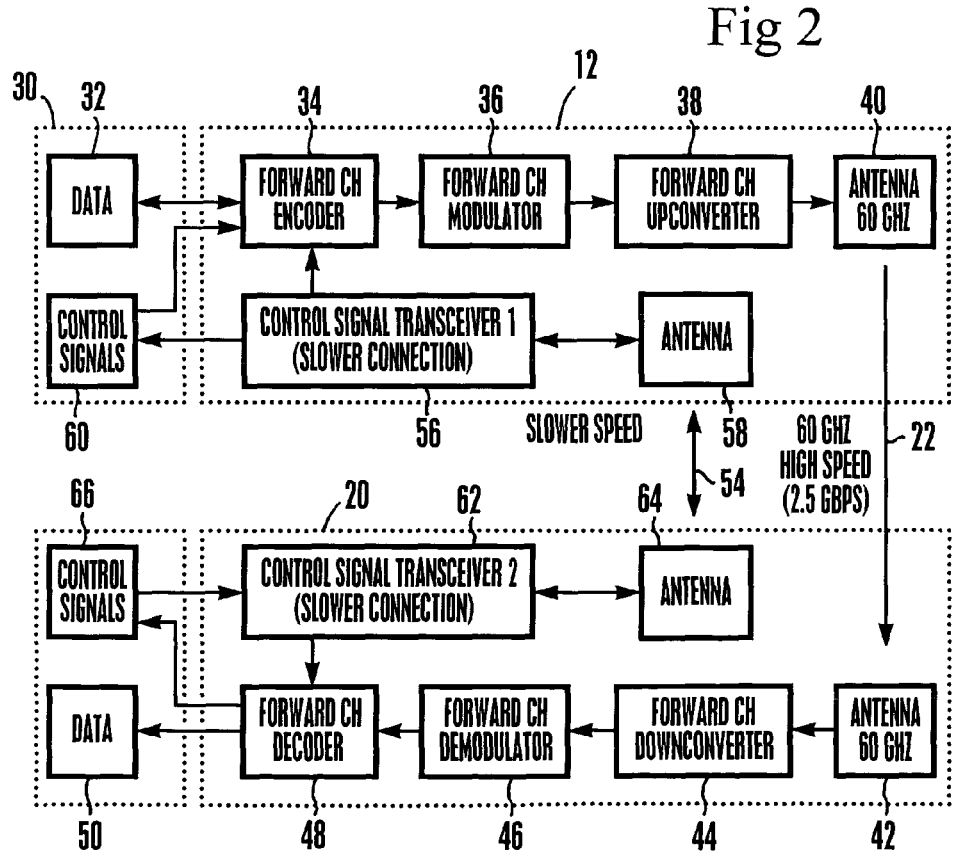
FIG. 2 is a block diagram of the detailed architecture.

FIG. 2 shows further details of the system 10. The preferred multimedia source 12 includes a processor 30 that accesses a data storage device 32 such as a hard disk drive, CD, or DVD to send multimedia data to a forward channel encoder 34 for encoding in accordance with principles known in the art. The encoded data is modulated at approximately 60 GHz by a 60 GHz forward channel modulator 36 and upconverted by an upconverter 38 for transmission over the link 22 at about 60 GHz through a first source antenna 40 that is configured as appropriate as a 60 GHz antenna. Using the above-described wide channel and a simpler modulation scheme such as but not limited to DQPSK, QPSK, BPSK or 8-PSK, a high data rate yet simple system can be achieved. For example, when DQPSK is used, a data rate of twice the symbol rate can be achieved. For 8-PSK a data rate of 3.3 Gbps may be achieved. If desired, a copy protect system such as high definition copy protection (HDCP) can be used with the multimedia content in accordance with HD principles known in the art.

The multimedia signal is received at a first player antenna 42 (configured for 60 GHz operation) on the player 20. In accordance with principles known in the art, the signal is downconverted at a forward channel downconverter 44 and demodulated from 60 GHz at a forward channel 60 GHz demodulator 46, and then decoded at a forward channel decoder 48 that can undertake error correction and multiplexing functions. The decoded signal may be stored in a data storage device 50 of a processor 52 of the player 20. It will be recognized by those skilled in the art that the components 34-38 of the player 12 establish at least a portion of a wireless transmitter and the components 44-48 of the player 20 establish at least a portion of a wireless receiver.

In addition to carrying the multimedia data proper, the primary link 22 may carry control information and encoding keys multiplexed within the multimedia data, so that the decoder 48 can decode the streams and so that the audio and video display functions (including trick play features) of the player 20 can be controlled at the source 12. If desired, the primary link 22 can be a full duplex link, so that the player 20 can communicate information back to the source 12. For example, the player 20 may communicate capabilities and if necessary its own encryption keys to the source 12. Or, the player 20 can communicate reception conditions so that the transmission power of the source 12 and/or directivity of the first source antenna 40 can be established to minimize power while maximizing reception. Automatic gain control and automatic antenna beam control adjustment thereby can be effected by the processor 30 of the source 12.

Alternatively, a secondary, relatively slower speed link 54 such as but not limited to Bluetooth, 802.11, 802.15, infrared, PLC, HPNA, or any other suitable bidirectional link may be provided to communicate the above-described control, encryption, and capability signals (i.e., the non-multimedia data). When a secondary link is used, the source 12 includes a control signal transceiver 56 that sends and receives the above-described signals over a second source antenna 58 and that stores/processes the control signals in a control signal module 60. The module 60 may be a software-implemented module accessed by the processor 30 of the source 12 as shown. Similarly, when a secondary link is used, the player 20 includes a control signal transceiver 62 that sends and receives the above-described signals over a second player antenna 64 and that stores/processes the control signals in a control signal module 66. The module 66 may be a software-implemented module accessed by the processor 52 of the player 20 as shown. The use of the control signals, encryption keys, and capability signals is in accordance with principles known in the art. The present 60 GHz, +2.0 Gbps system may also be used in other applications, such as conveying music files, movies, or other data between two compliant devices.

With the above-described high frequency high data rate system, the above-described components can be made relatively small, resulting in cost savings. Also, better antenna beam control can be achieved with a 60 GHz system compared to lower frequency systems, facilitating the use of lower transmission powers and thus saving power while minimizing the likelihood of success of eavesdroppers. The very short range of 60 GHz signals (which cannot penetrate walls) permits space domain multiplexing, allowing greater usage of the available bandwidth without interference between users. The limited propagation and wideband signal afford greater security and content protection than lower frequency, narrower bandwidth systems.

In greater detail, the advantages of the present invention include:
Short wavelength:
  easy to control antenna beam form because antenna can be small, for example a phased array antenna can be small.
  circuit size is small.
  because the antenna beam control is easy, and interference from distant devices is negligible, multiple devices can share a spectrum.
  small circuit enables a lower cost, compact design.
High frequency:
  Makes design of a wideband system relatively easy. For example, in the case of a bandwidth of 2.5 GHz, the ratio of the bandwidth to the center frequency is 2.5 GHz/60

GHz=4.2%. Were a 2.5 GHz bandwidth antenna to be designed at 5 GHz, the ratio would be 2.5 GHz/5 GHz=50%. As recognized herein a 4.2% antenna design is much easier to achieve than a 50% antenna design. That is, the higher the center frequency, the easier it is to design wideband system. Also, the fixed frequency of nominally 60 GHz simplifies the design of the transmitters and receivers, which need be configured for a single primary frequency only. The fixed data rate also simplifies system design.

Wide bandwidth:

because a wide bandwidth is available, a simpler modulation scheme can be employed, and it is possible to simplify the transmitter and receiver designs. This is particularly important in light of the above-envisioned high data rate. The fixed, wide bandwidth of 2.5 GHz simplifies the modulation used and the design of the transmitting and receiving components.

Limited Propagation distance:

reduces the interferences from other devices, allowing use of a simple communication protocol and also allowing many devices to exist in a small area.

limited propagation means low transmission power can be used.

Uncompressed transmission:

On Screen Display is easier, e.g., if a user browses through a channel table superimposed on display, if MPEG compression and decompression are employed the response otherwise would be slower than that afforded by the use of uncompressed transmission.

Picture quality is significantly better with uncompressed HD video as opposed to compressed video.

While the particular METHOD AND SYSTEM FOR WIRELESS DIGITAL VIDEO PRESENTATION as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:

1. A system, comprising:
    a source of multimedia data; and
    a displayer of multimedia data mounted in a room in which the source is disposed, the source wirelessly transmitting the multimedia data in an uncompressed form to the displayer on a primary link at approximately sixty GigaHertz (60 GHz), wherein the primary link has a data rate of at least two Giga bits per second (2.0 Gbps) and the primary link has a bandwidth of approximately 2.5 GHz, the source and displayer not being disposed together in a common package, wherein the displayer sends to the source capability signals on the primary link to adjust a directivity of an antenna beam transmitted by the source, wherein displayer control signals are multiplexed with the multimedia data on the primary link such that the audio and video display functions of the displayer can be controlled at the source.

2. The system of claim 1, wherein the displayer is a projector.

3. The system of claim 1, wherein the primary link is a full duplex link.

4. The system of claim 1, wherein at least one of: encryption keys, capability signals, are multiplexed with the multimedia data on the primary link.

5. The system of claim 1, wherein the displayer and source further communicate at least one of: encryption keys, displayer control signals, capability signals, on a secondary link having a data rate lower than the data rate of the primary link.

6. A system, comprising:
    a source of multimedia data; and
    a displayer of multimedia data mounted in a room in which the source is disposed, the source wirelessly transmitting the multimedia data in an uncompressed form to the displayer on a primary link at approximately sixty GigaHertz (60 GHz), wherein the primary link has a data rate of at least two Giga bits per second (2.0 Gbps) and the primary link has a bandwidth of approximately 2.5 GHz, wherein control signals are sent between the source and displayer to adjust a directivity of an antenna beam transmitted by the source, at least some control signals indicating a reception condition at the receiver useful for establishing a source antenna beam directivity, wherein displayer control signals are multiplexed with multimedia data on the primary link such that the audio and video display functions of the displayer can be controlled at the source.

7. The system of claim 1, wherein the data is high definition (HD) multimedia data.

8. A method for transmitting multimedia data, comprising:
    disposing a multimedia transmitter and a multimedia receiver in a room on different surfaces from each other;
    establishing a wireless link between the transmitter and receiver; and
    wirelessly transmitting a multimedia signal on the link from the transmitter to the receiver at a frequency sufficiently high that the signal substantially cannot be received outside the room, signals being exchanged between the transmitter and receiver, wherein player control signals multiplexed in the multimedia are sent between the transmitter and receiver, at least some control signals being useful for establishing a transmitter antenna beam control, the control signals being such that audio and video display functions of the receiver can be controlled at the transmitter.

9. The method of claim 8, wherein the multimedia signal carries uncompressed high definition multimedia data.

10. The method of claim 8, wherein the frequency is approximately sixty GigaHertz (60 GHz).

11. The method of claim 10, wherein the link has a data rate of at least two Giga bits per second (2.0 Gbps).

12. The method of claim 8, at least one of: encryption keys, capability signals, are communicated between the transmitter and receiver on a secondary link.

13. A computer comprising:
 means for storing multimedia data; and
 means for wirelessly transmitting, to a receiver, the multimedia data in uncompressed form on a link having a frequency of approximately sixty GigaHertz (60 GHz) wherein capability signals are sent from the receiver to the means for wirelessly transmitting to cause the means for wirelessly transmitting to adjust a directivity of an antenna beam transmitted by the means for wirelessly transmitting, control signals being sent from the means for wirelessly transmitting to the means for wirelessly receiving such that audio video functions of the means for wirelessly receiving can be controlled at the means for wirelessly transmitting, control signals being multiplexed in the multimedia data.

14. The computer of claim 13, wherein the multimedia data is transmitted from the computer to the receiver on a primary link.

15. The computer of claim 14, wherein the primary link is a full duplex link.

16. The computer of claim 13, wherein control signals are sent between the computer and receiver, at least some control signals being useful for establishing at least one of: a multimedia player transmission power level, a multimedia player antenna beam control.

17. The multimedia player of claim 13, wherein the multimedia data is high definition (HD) multimedia data.

18. A system, comprising:
 a source of multimedia data; and
 a display for the multimedia data, the source wirelessly transmitting the multimedia data in an uncompressed form to the display on a primary link at approximately sixty GigaHertz (60 GHz), wherein control signals are multiplexed in the multimedia and sent between the source and display, at least some control signals being useful for establishing a source antenna beam form control including establishing a source beam directivity, control signals being sent from the source to the display such that audio and video display functions of the display can be controlled by the source.

19. The system of claim 18, wherein the source of multimedia data is a set-top box like device capable of decoding compressed multimedia content as received from at least one of: satellite, cable, terrestrial broadcast, internet streaming.

20. The system of claim 18, wherein the display is selected from the group consisting of cathode ray tubes (CRT), liquid crystal displays (LCD), plasma display panels (PDP), TFTs.

21. The system of claim 18, wherein the primary link has a data rate of approximately two and a half gigabytes per second (2.5 Gbps).

22. The system of claim 18, wherein the primary link is a full duplex link.

23. The system of claim 18, wherein at least one of: encryption keys, player control signals, capability signals, are multiplexed with the multimedia data on the primary link.

24. The system of claim 18, wherein the player and source further communicate at least one of: encryption keys, player control signals, capability signals, on a secondary link having a data rate lower than the data rate of the primary link.

25. The system of claim 18, wherein the data is high definition (HD) multimedia data.

* * * * *